United States Patent
Faurot, III et al.

(10) Patent No.: US 12,314,999 B2
(45) Date of Patent: May 27, 2025

(54) MAPPING RECIPE INGREDIENTS TO PRODUCTS

(71) Applicant: Maplebear Inc., San Francisco, CA (US)

(72) Inventors: William Silverthorne Faurot, III, Seattle, WA (US); Tyler Russell Tate, Lexington, KY (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 18/139,289

(22) Filed: Apr. 25, 2023

(65) Prior Publication Data

US 2023/0260007 A1    Aug. 17, 2023

Related U.S. Application Data

(63) Continuation of application No. 17/196,879, filed on Mar. 9, 2021, now Pat. No. 11,676,196.

(51) Int. Cl.
*G06Q 30/00* (2023.01)
*G06F 16/2457* (2019.01)
*G06N 20/00* (2019.01)
*G06Q 30/0601* (2023.01)

(52) U.S. Cl.
CPC ... *G06Q 30/0631* (2013.01); *G06F 16/24578* (2019.01); *G06N 20/00* (2019.01); *G06Q 30/0641* (2013.01)

(58) Field of Classification Search
None
See application file for complete search history.

(56) References Cited

U.S. PATENT DOCUMENTS

| | | | |
|---|---|---|---|
| 9,165,320 B1 | 10/2015 | Belvin | |
| 11,354,722 B1* | 6/2022 | Singh | G06Q 30/0633 |
| 2002/0147642 A1 | 10/2002 | Avallone et al. | |
| 2013/0268317 A1 | 10/2013 | Mattila | |

(Continued)

OTHER PUBLICATIONS

Haryo Akbarianto Wibowo "Recibrew! Predicting Food Ingredients with Deep Learning!" Jun. 23, 2020. Retrieved from https://pub.towardsai.net/recibrew-find-out-the-foods-ingredients-dbc2a4e37383 (Year: 2020).*

(Continued)

*Primary Examiner* — Mila Airapetian
(74) *Attorney, Agent, or Firm* — Fenwick & West LLP (57) ABSTRACT

An online system receives a recipe from a customer mobile device. The online system performs natural language processing on the recipe to determine parsed ingredients. For each of one or more of the determined parsed ingredients, the online system maps the parsed ingredient to a generic item. The online system queries a product database with the mapped generic item to obtain one or more products associated with the mapped generic item. The online system applies a machine-learned conversion model to each of the one or more products to determine a conversion likelihood for the product. The conversion model may be trained based on historical data describing previous conversions made by customers presented with an opportunity to add products to an order. The online system selects a product from the one or more products based on the determined conversion likelihoods and adds the selected product to an order.

18 Claims, 8 Drawing Sheets

(56) References Cited

U.S. PATENT DOCUMENTS

| | | |
|---|---|---|
| 2015/0242468 A1* | 8/2015 | Shoemaker .......... G06F 40/284 |
| | | 707/755 |
| 2015/0278859 A1 | 10/2015 | Sundaresan |
| 2016/0232624 A1 | 8/2016 | Goldberg et al. |
| 2016/0350832 A1 | 12/2016 | Franklin et al. |
| 2017/0032446 A1 | 2/2017 | Merz et al. |
| 2017/0193584 A1 | 7/2017 | Narasimhan et al. |
| 2017/0345072 A1 | 11/2017 | Chang |
| 2019/0236676 A1 | 8/2019 | Achan et al. |
| 2020/0410573 A1 | 12/2020 | Kraus |
| 2021/0090154 A1 | 3/2021 | Michaelson et al. |
| 2022/0351239 A1 | 11/2022 | Eletreby et al. |

OTHER PUBLICATIONS

Leitch, J. "Building a Recipe Recommendation System," towardsdatascience.com, Jul. 28, 2021, Retrieved from the internet <URL:https://towardsdatascience.com/building-a-recipe-recommendation-system-297c229dda7b>.

United States Office Action, U.S. Appl. No. 17/196,879, Jun. 28, 2022, 18 pages.

United States Office Action, U.S. Appl. No. 17/196,879, Oct. 6, 2021, 16 pages.

* cited by examiner

MAPPING RECIPE INGREDIENTS TO PRODUCTS

CROSS REFERENCE TO RELATED APPLICATIONS

This application is a continuation of co-pending U.S. application Ser. No. 17/196,879, filed Mar. 9, 2021, which is incorporated by reference in its entirety.

BACKGROUND

This disclosure relates generally to recipe mapping. More particularly, the disclosure relates to mapping ingredients in recipes to products available for purchase at retailers.

Online concierge systems allow customers to place orders of items. However, when ordering, a customer may be unsure of what to purchase for a future meal. Even if a customer has a recipe he/she would like to follow, he/she may need to spend the time and effort finding all of the ingredients on the online concierge system without knowing if a retailer has those ingredients available for purchase. Thus, a system for recommending recipes and determining products for recipes is needed.

SUMMARY

To determine products for a recipe, an online concierge system receives a recipe from a customer mobile device associated with a customer. The online concierge system parses ingredients from the recipe using natural language processing and maps the ingredients to generic items. The online concierge system determines one or more products corresponding to each generic item and applies a machine-learned model to each of the one or more products to determine a conversion likelihood for each product, which the online concierge system uses to select a product to add to an order for the customer.

More particularly, in some embodiments, the online concierge system receives, from a customer mobile device, a recipe. The online concierge system performs natural language processing on the recipe to determine a set of parsed ingredients. For each of one or more of the set of parsed ingredients, the online concierge system maps the parsed ingredient to a generic item of a plurality of generic items in a product database that associates generic items with a set of products that represent items for sale at a retailer. The online concierge system queries the product database with the mapped generic item to obtain one or more products associated with the mapped generic item in the product database. The online concierge system applies a machine-learned conversion model to each of the one or more products to determine a conversion likelihood for the product. The conversion model may be trained based on historical data describing previous conversions made by customers presented with an opportunity to add products to an order. The online concierge system selects a product from the one or more products based on the determined conversion likelihoods and adds the selected product to an order associated with the customer mobile device.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Environment of an Online Concierge System

Figure 1:
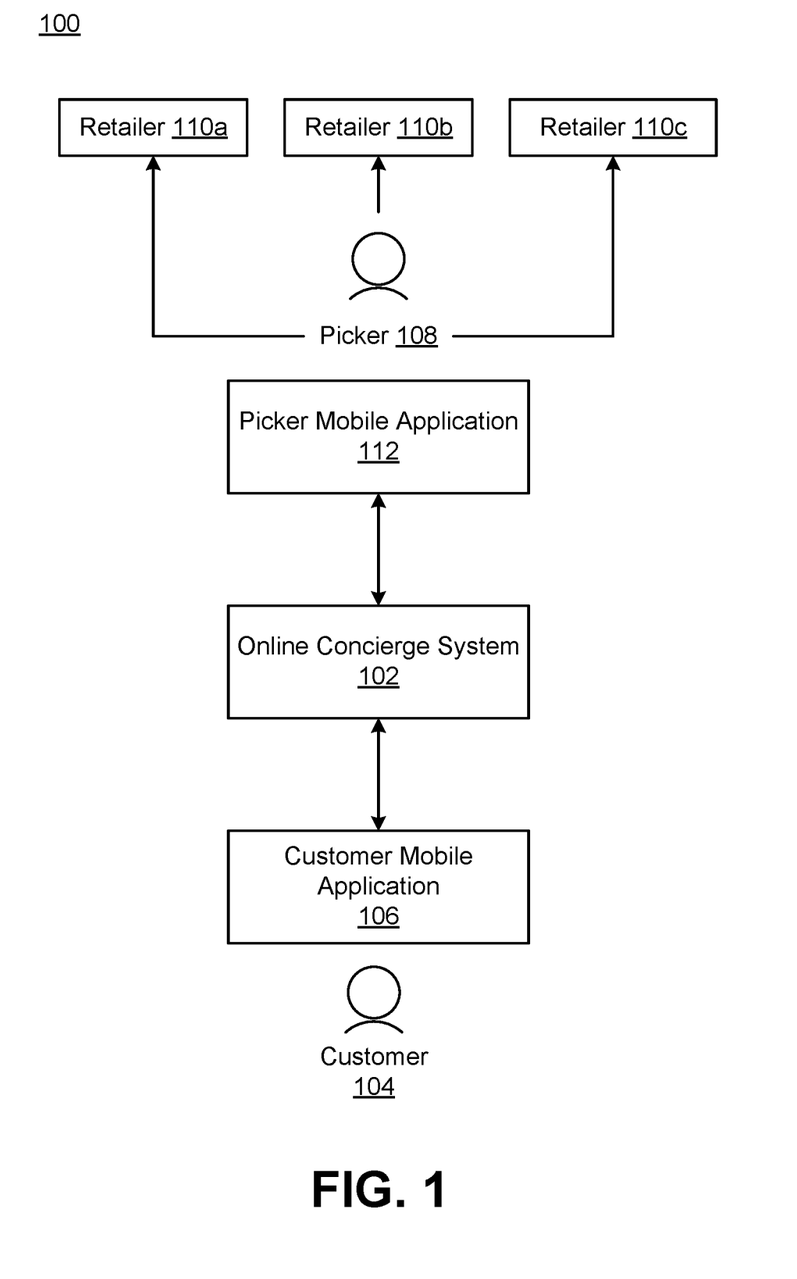
FIG. 1 illustrates the environment of an online concierge system, according to one embodiment.

FIG. 1 illustrates the environment 100 of an online concierge system 102, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The online concierge system 102 is configured to receive orders from one or more customers 104 (only one is shown for the sake of simplicity). An order specifies a list of goods (items or products) to be delivered to the customer 104. The order also specifies the location to which the goods are to be delivered, and a time window during which the goods should be delivered. In some embodiments, the order specifies one or more retailers from which the selected items should be purchased. The customer 104 may use a customer mobile application (CMA) 106 to place the order; the CMA 106 is configured to communicate with the online concierge system 102.

The online concierge system 102 is configured to transmit orders received from customers 104 to one or more pickers 108. A picker 108 may be a contractor, employee, or other person (or entity) who is enabled to fulfill orders received by the online concierge system 102. The environment 100 also includes three retailers 110a, 110b, and 110c (only three are shown for the sake of simplicity; the environment could include hundreds of retailers). The retailers 110 may be physical retailers, such as grocery stores, discount stores, department stores, etc., or non-public warehouses storing items that can be collected and delivered to customers 104. The retailers may also be referred to as warehouse locations. Each picker 108 fulfills an order received from the online concierge system 102 at one or more retailers 110, delivers the order to the customer 104, or performs both fulfillment and delivery. In one embodiment, pickers 108 make use of a picker mobile application 112 which is configured to interact with the online concierge system 102.

Online Concierge System

Figure 2:
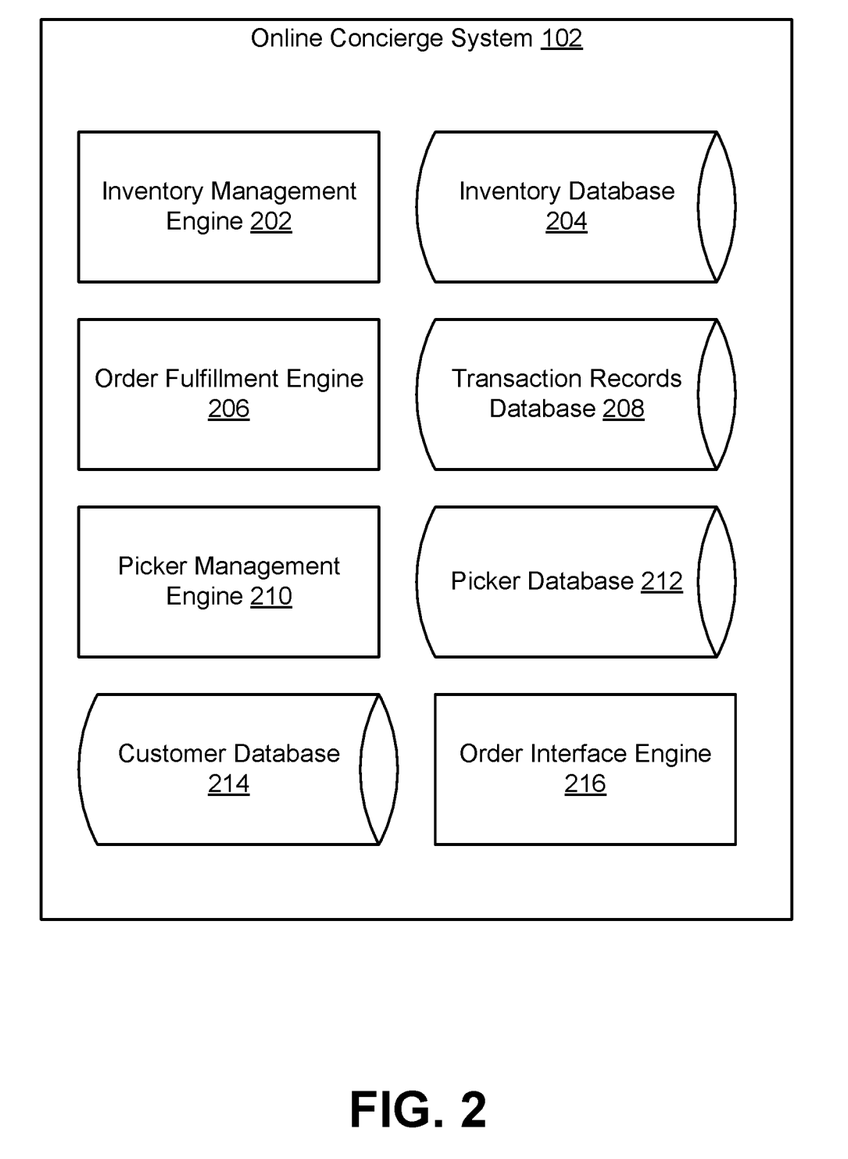
FIG. 2 is a block diagram of an online concierge system, according to one embodiment.

FIG. 2 is a block diagram of an online concierge system 102, according to one embodiment. The online concierge system 102 includes an inventory management engine 202, which interacts with inventory systems associated with each retailer 110. In one embodiment, the inventory management engine 202 requests and receives inventory information maintained by the retailer 110. The inventory of each retailer 110 is unique and may change over time. The inventory management engine 202 monitors changes in inventory for each participating retailer 110. The inventory management engine 202 is also configured to store inventory records in an inventory database 204. The inventory database 204 may store information in separate records—one for each participating retailer 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204.

The online concierge system 102 also includes an order fulfillment engine 206 which is configured to synthesize and display an ordering interface to each customer 104 (for example, via the customer mobile application 106). The order fulfillment engine 206 is also configured to access the inventory database 204 in order to determine which products are available at which retailers 110. The order fulfillment engine 206 determines a sale price for each item ordered by a customer 104. Prices set by the order fulfillment engine 206 may or may not be identical to in-store prices determined by retailers 110 (which is the price that customers 104 and pickers 108 would pay at retailers). The order fulfillment engine 206 also facilitates transactions associated with each order. In one embodiment, the order fulfillment engine 206 charges a payment instrument associated with a customer 104 when he/she places an order. The order fulfillment engine 206 may transmit payment information to an external payment gateway or payment processor. The order fulfillment engine 206 stores payment and transactional information associated with each order in a transaction records database 208.

The order fulfillment engine 206 also determines replacement options for items in an order. For each item in an order, the order fulfillment engine 206 may retrieve data describing items in previous orders facilitated by the online concierge system 102, previously selected replacement options for that item, and similar items. Similar items may be items of the same brand or type or of a different flavor. Based on this data, the order fulfillment engine 206 creates a set of replacement options for each item in the order comprising the items from the data. The order fulfillment engine 206 ranks replacement options in the set to determine which items to display to the customer 104. In some embodiments, the order fulfillment engine 206 may rank the replacement options by the number of previous orders containing the replacement option or user quality ratings gathered by the online concierge system 102. In some embodiments, the order fulfillment engine 206 only uses data for the customer 104 related to the order to suggest replacement options.

In some embodiments, the order fulfillment engine 206 also shares order details with retailer 110. For example, after successful fulfillment of an order, the order fulfillment engine 206 may transmit a summary of the order to the appropriate retailer 110. The summary may indicate the items purchased, the total value of the items, and in some cases, an identity of the picker 108 and customer 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a picker management engine 210, which manages communication with and utilization of pickers 108. In one embodiment, the picker management engine 210 receives a new order from the order fulfillment engine 206. The picker management engine 210 identifies the appropriate retailer 110 to fulfill the order based on one or more parameters, such as the contents of the order, the inventory of the retailers 110, and the proximity to the delivery location. The picker management engine 210 then identifies one or more appropriate pickers 108 to fulfill the order based on one or more parameters, such as the picker's proximity to the appropriate retailer 110 (and/or to the customer 104), his/her familiarity level with that particular retailer 110, and so on. Additionally, the picker management engine 210 accesses a picker database 212 which stores information describing each picker 108, such as his/her name, gender, rating, previous shopping history, and so on. The picker management engine 210 transmits the list of items in the order to the picker 108 via the picker mobile application 112. The picker database 212 may also store data describing the sequence in which the pickers 108 picked the items in their assigned orders.

As part of fulfilling an order, the order fulfillment engine 206 and/or picker management engine 210 may access a customer database 214 which stores information describing each customer 104. This information could include each customer's name, address, gender, shopping preferences, favorite items, historical orders, stored payment instruments, and so on.

The order interface engine 216 determines a set of products for ingredients of a recipe received and/or selected via the CMA 106. In particular, the order interface engine 216 uses natural language processing, mappings between ingredients, generic items, and products, and a machine-learned conversion model to determine products for the recipe. The order interface engine 216 is further described in relation to FIG. 4.

Figure 3A:
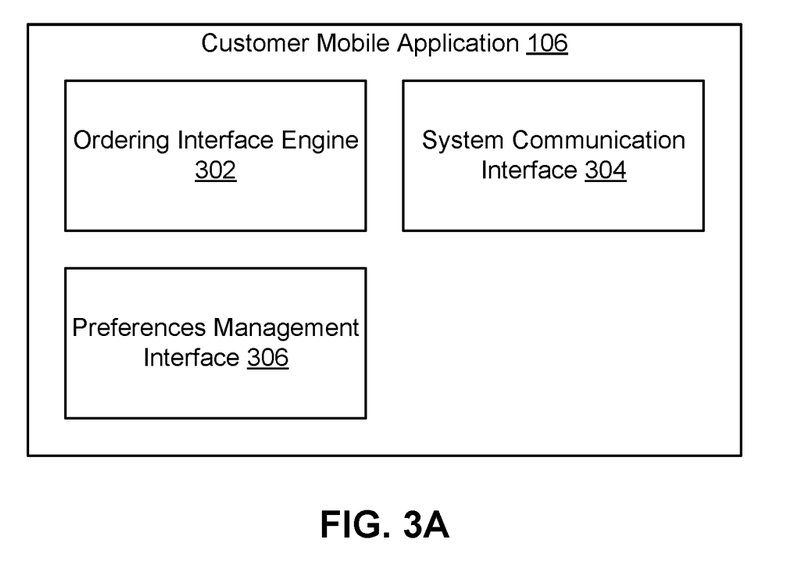
FIG. 3A is a block diagram of the customer mobile application (CMA), according to one embodiment.

FIG. 3A is a block diagram of the customer mobile application (CMA) 106, according to one embodiment. The customer 104 accesses the CMA 106 via a client device, such as a mobile phone, tablet, laptop, or desktop computer. The CMA 106 may be accessed through an app running on the client device or through a website accessed in a browser. The CMA 106 includes an ordering interface 302, which provides an interactive interface, known as a customer ordering interface, with which the customer 104 can browse through to select products to add to orders and place the orders for fulfillment.

Customers 104 may also use the customer ordering interface to message with pickers 108 and receive notifications regarding the status of their orders. Customers 104 may view their orders and communicate with pickers 108 regarding an issue with an item in an order using the customer ordering interface. For example, a customer 104 may respond to a message from a picker 108 indicating that an item cannot be retrieved for the order by selecting a replacement option for the item or requesting a refund via buttons on the customer ordering interface. Based on the chosen course of action, the customer ordering interface generates and displays a template message for the customer 104 to send to the picker 108. The customer 104 may edit the template message to include more information about the item or course of action and communicate back and forth with the picker 108 until the issue is resolved.

Customers may also view recipes via the customer ordering interface. In particular, the CMA 106 may request recipes to present to a customer 104 from the order interface engine 216, which determines recipes for the customer 104 based on customer information. Such customer information may include cuisines the customer 104 likes, products the customer 104 has previously bought, recipes the customer 104 has used or saved, a preferred retailer 110 for the customer's orders, and the like. The customer ordering interface may present a plurality of widgets each representing a recipe selected by the order interface engine 216 for the customer 104. The widgets may presented in a grid or a carousel on the customer ordering interface. A customer 104 may interact a widget to view recipe information about the recipe. The CMA 104 requests recipe information for the recipe from the order interface engine 216 to present via the customer ordering interface. The recipe information may include one or more of a title, set of ingredients, instructions, images, videos, cook time, level, number of servings, nutrition information, ratings, comments, and characteristics of a recipe.

In some embodiments, a customer mobile device running the CMA 106 may interact with the online concierge system 102 through an application programming interface (API) running on a native operating system of the customer mobile device. Third party systems may use the API to access functionality of the online concierge system 102. In particular, the API may function to track events (e.g., requests for purchasing ingredients of recipes) that occur from customers 104 on the third party systems' applications. For a request, the API may receive a list of ingredients, a recipe, or a link to a webpage with a recipe from a third party system application. The CMA 106 sends the ingredients or recipe to the order interface engine 216 to determine a set of products or may extract ingredients from the webpage of the link to send to the order interface engine 216.

Alternatively, the CMA 106 may use a tracking pixel or piece of HTML code placed on a third party webpage (e.g., provided by a third party system) to log interactions with an add button that redirects a customer 104 to a web page of the CMA 106 to add products for a recipe of the third party webpage. A tracking pixel may result in a transparent 1×1 image or other suitable object created for third party webpages. For instance, when a customer's browser (or other application) loads a page with the tracking pixel, the tracking pixel results in the customer's browser attempting to retrieve the content for that tracking pixel, and the browser contacts the online concierge system 102 via the CMA 106 to retrieve products for the ingredients or recipe. The CMA 106 may send recipe information about the recipe from the browser to the order interface engine 216 to determine products for the recipe.

In some embodiments, a third party system may draw an iframe from the CMA 106 that allows a customer 104 to interact with the CMA 104 while at a web page from the third party system. The CMA 106 may retrieve information identifying the customer 104, such as a customer identifier, information about a mobile device of the customer 104, or an Internet Protocol (IP) address of the customer 104, via a cookie set by the online concierge system 102. The iframe may present an add button to the customer 104 at the webpage such that the customer 104 may interact with the add button to add products for a recipe to an order via the CMA 106. The CMA 106 may receive, via the Uniform Resource Locator (URL) for the iframe, an identity of the third party system, identifier or a recipe, and/or identifier of the webpage when the third party system requests information from the CMA 106 to present in the iframe (e.g., the add button or an order for the customer 104). The CMA 106 uses this information and/or information embedded in the URL to determine what webpage the iframe is located at and identify the recipe based on the web page. The CMA 106 may send the recipe to the order interface engine 216 to determine products that are added to an order for the customer 104. Further, in some embodiments, a link to CMA 106 may be incorporated in content for a recipe from a third party system, such that when a customer clicks on the link, the customer mobile device communicates the recipe to the CMA 106 and adds products for the recipe to an order for the customer 104.

When viewing a recipe via the customer ordering interface, a customer 104 may interact with an interactive element to add products for the recipe to an order. The CMA 104 may request and receive products for the recipe from the order interface engine 216 responsive to receiving an interaction with the interactive element or a widget for the recipe. In some embodiments, the customer ordering interface may display the products with interactive elements that allow the customer 104 to select or unselect each product for inclusion in the order, alter the quantity of each product, replace products with alternatives, and the like before adding the products to the order. The customer 104 may additionally add reviews of recipes, save recipes to a personal selection of recipes stored in association with the customer's account, share the recipe to a social media platform, search recipes, respond to notifications, and reorder products for previous recipes via interactions with the customer ordering interface. The customer ordering interface is further described in relation to FIGS. 5A-5C.

The CMA 106 also includes a system communication interface 304 which, among other functions, receives inventory information from the online concierge system 102 and transmits order information to the online concierge system 102. The CMA 106 also includes a preferences management interface 306 which allows the customer 104 to manage basic information associated with his/her account, such as his/her home address and payment instruments. The preferences management interface 306 may also allow the user to manage other details such as his/her favorite or preferred retailers 110, preferred delivery times, special instructions for delivery, and so on.

Figure 3B:
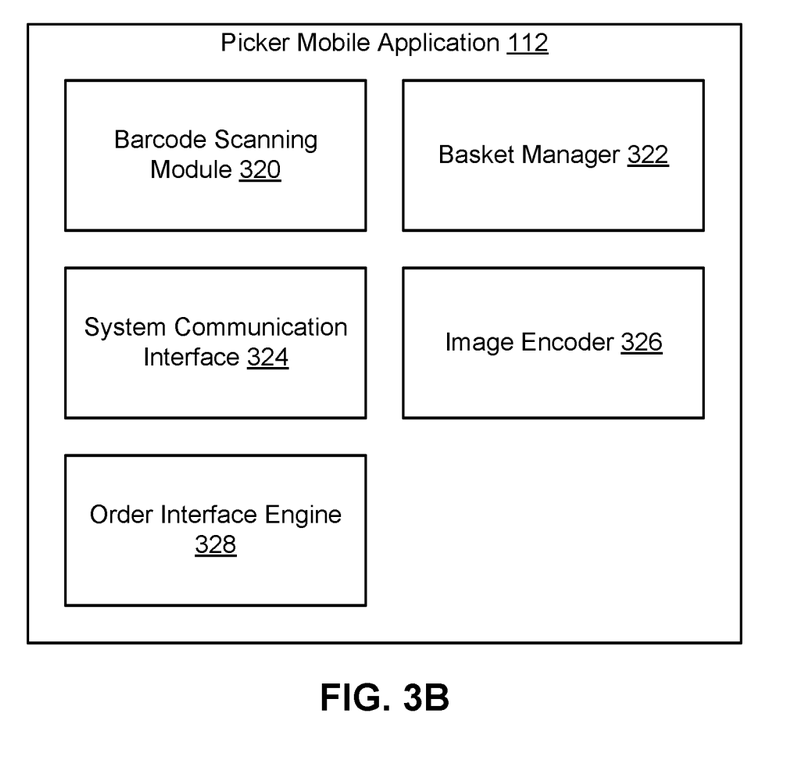
FIG. 3B is a block diagram of the picker mobile application (PMA), according to one embodiment.

FIG. 3B is a block diagram of the picker mobile application (PMA) 112, according to one embodiment. The picker 108 accesses the PMA 112 via a mobile client device, such as a mobile phone or tablet. The PMA 112 may be accessed through an app running on the mobile client device or through a website accessed in a browser. The PMA 112 includes a barcode scanning module 320 which allows a picker 108 to scan an item at a retailer 110 (such as a can of soup on the shelf at a grocery store). The barcode scanning module 320 may also include an interface which allows the picker 108 to manually enter information describing an item (such as its serial number, SKU, quantity and/or weight) if a barcode is not available to be scanned. The PMA 112 also includes a basket manager 322 which maintains a running record of items collected by the picker 108 for purchase at a retailer 110. This running record of items is commonly known as a "basket." In one embodiment, the barcode scanning module 320 transmits information describing each item (such as its cost, quantity, weight, etc.) to the basket manager 322, which updates its basket accordingly. The PMA 112 also includes an image encoder 326 which encodes the contents of a basket into an image. For example, the image encoder 326 may encode a basket of goods (with an identification of each item) into a QR code which can then be scanned by an employee of the retailer 110 at check-out.

The PMA 112 also includes a system communication interface 324, which interacts with the online concierge system 102. For example, the system communication interface 324 receives information from the online concierge system 102 about the items of an order, such as when a customer 104 updates an order to include more or fewer items. The system communication interface 324 may receive notifications and messages from the online concierge system 102 indicating information about an order or communications from a customer 104. The system communication interface 324 may additionally generate a picker order interface to be transmitted via the PMA 112 to a picker to show orders submitted by customers 104, and messages from customers 104.

In some embodiments, the PMA 112 also includes a preferences management interface 306 which allows the picker 108 to manage basic information associated with his/her account, such as his/her name, preferred shopping zone, status, and other personal information. The preferences management interface 306 may also allow the picker 108 to review previous orders and/or his/her shopping level.

Figure 4:
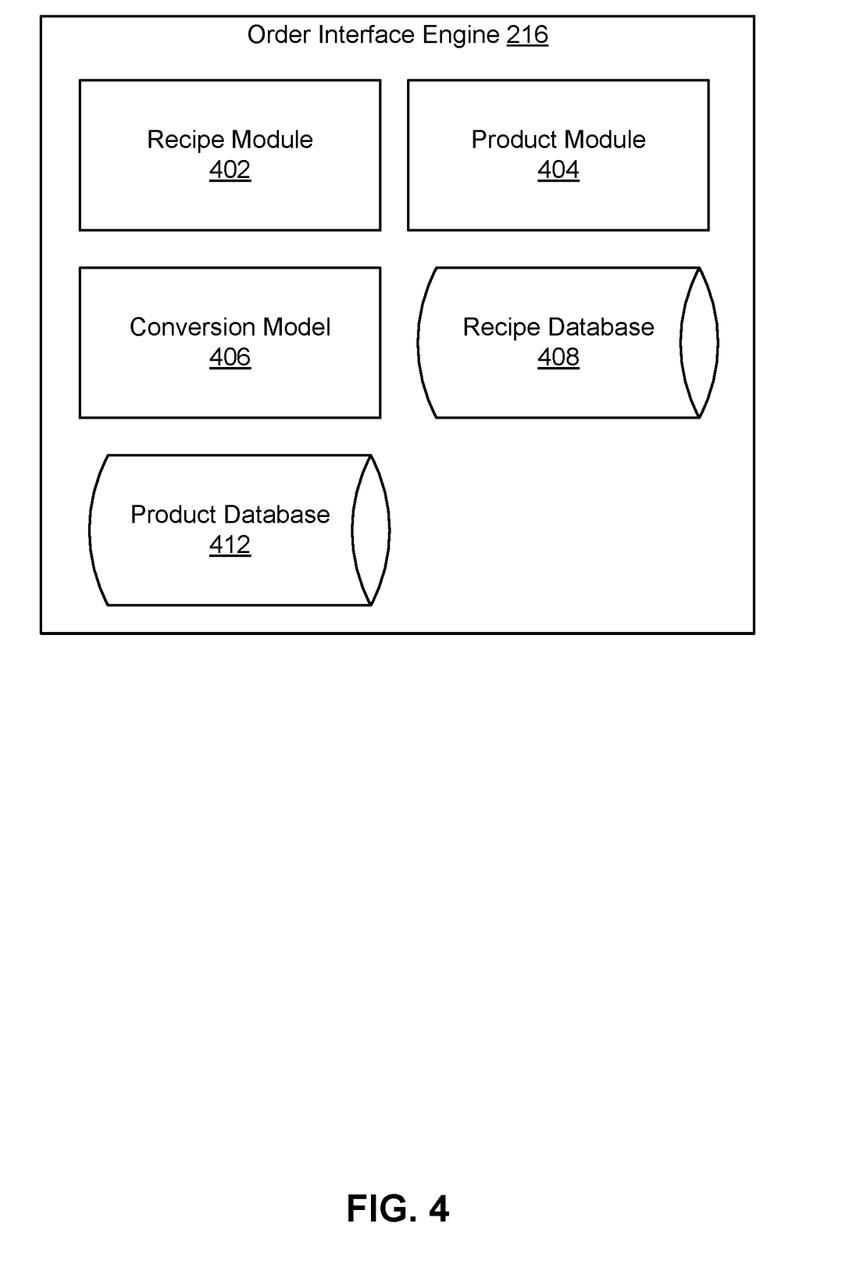
FIG. 4 is a block diagram of an order interface engine, according to one embodiment.

FIG. 4 is a block diagram of the order interface engine 216, according to one embodiment. The order interface engine 216 includes a recipe module 402, a product module 404, conversion model 406, a recipe database 408, and a product database 410. In some embodiments, the order interface engine 216 has more or different components than those shown in FIG. 4, or the components shown in FIG. 4 may be combined or removed. In other embodiments, the methods and processes described in relation to the order interface engine 216 may be performed at other engines or systems.

The recipe module 402 determines recipes for customers 104. In particular, the recipe module 402 receives requests for recipes from the CMA 106. A recipe is a set of instructions for cooking/baking food and includes a set of ingredients along with other recipe information, such as a title, images, videos, cook time, level, number of servings, nutrition information, ratings, comments, and characteristics of a recipe (e.g., type of cuisine, meal recipe is used for, theme, etc.). For a request for recipes, the recipe module 402 may receive customer information about a customer 104 associated with the request from the customer database 214. The customer information may include cuisines the customer 104 likes, products the customer 104 has previously ordered, recipes the customer 104 has used or saved, a preferred retailer 110 for the customer's orders, and other attributes describing the customer 104 (e.g., vegetarian, allergic to peanuts, always replaces "spaghetti" products with "penne" products in recipes, etc.).

Based on the customer information, the recipe module 402 determines a set of recipes for the customer 104. The recipe module 402 accesses recipes and associated recipe information from the recipe database 408. In some embodiments, the recipe module 402 uses natural language processing to match the customer information to recipe information in the recipe database 408. In other embodiments, the recipe module 402 may apply a machine-learned model to the customer information to determine, for each recipe in the recipe database 408, a likelihood that the customer 104 would follow the recipe. The machine-learned model may be trained on recipes (including recipe information) each labeled with customer information describing customers 104 who followed the recipe. The recipe module 402 may rank the recipes based on the determined likelihoods and select a subset of the recipes to send to the CMA 106 for presentation as suggested recipes. For instance, the recipe module 402 send a top percentage of the recipes or may filter out recipes the customer 104 has previously followed to send the remaining ranked recipes to the CMA 106.

The recipe module 402 may further receive requests for recipe information from the CMA 106. The request may indicate a recipe, which the recipe module 402 may retrieve recipe information for. The recipe module 402 sends the requested recipe information to the CMA 106 for display. The recipe module 402 may also store recipes received from third party systems, sent via the CMA 106, in the recipe database 412.

The product module 404 determines products for a recipe to add to an order. In particular, the product module 404 receives a request for products for a recipe from the CMA 106. The request may include information identifying the recipe, a customer 104 who placed the request via the CMA 106, and a retailer 110 for the order. The product module 404 retrieves the recipe information for the recipe from the recipe database 408 and determines a set of parsed ingredients. In some embodiments, the recipe information may include a list of ingredients, which the product module 404 may use as the parsed ingredients. In other embodiments, the product module 404 may perform natural language processing on the recipe information to extract the set of parsed ingredients from the instructions or list of ingredients of the recipe information. The product module 404 may use a named entity recognition algorithm or a machine-learned model trained to determine parsed ingredients from a recipe for the natural language processing. For example, the product module 404 may extract the parsed ingredient "finely chopped fresh parsley" from a recipe for "Parsley Pesto Pasta." The product module 404 stores the parsed ingredients in the recipe database 408 with the recipe. In some embodiments, if the product module has previously determined parsed ingredients for a recipe, the product module 404 may directly retrieve the parsed ingredients from the recipe database 408.

The product module 404 maps parsed ingredients to generic items in the product database 412. A generic item describes a generic version of a product, such that the generic item does not identify the brand or sub-type of the product. The product database 412 associates each generic item with a set of products that represent goods for sale at a retailer 110 or ingredients used in recipes available via the CMA 106. For example, the product database 404 correlates products such as "Moo Moo 2% Milk" and "Greener Pastures Organic Milk" to the generic item "milk." This removes the connection to specific types of milk, like "Organic," and specific brands of milk, like "Moo Moo." As another example, the product "Moo Moo Chocolate Milk" is connected to the generic item "chocolate milk" rather than the generic item "milk" since, in most cases, chocolate milk is not used as a substitute for regular milk.

The product module 404 maps each parsed ingredient to a generic item. In some embodiments, the product database 412 applies one or more string matching algorithms to match the parsed ingredient to a generic item. In other embodiments, the product module 404 applies a set of rules or a machine-learned model that analyzes the name of the parsed ingredient to determine a generic item. For example, a rule for identifying parsed ingredients that fall within the generic item "milk" specifies that parsed ingredient that include the word "milk" along with a milkfat word (e.g., "skim," "2%," "whole"), but does not include flavor words (e.g., "chocolate," "strawberry," etc.) or milk substitute words (e.g., "soy," "oat," "almond"), are associated with the generic item "milk." The product module 404 may store each mapped generic item in the recipe database 410 with the parsed ingredient and may store the parsed ingredient in association with the mapped generic item in the product database 412 for reference when matching parsed ingredients from other recipes to generic items.

In some embodiments, the product module 404 detects one or more staples items in the generic items for the recipe. A staple item is a product often bought by customers of the online concierge system 102 or often kept on hand within customer's households (e.g., "sugar," "salt," "flour," etc.). In some embodiments, the product module 404 (or another component of the online concierge system 102) may determine staple items based on historical order history for a plurality of customers 104 and flag generic items in the product database 412 as staple items (e.g., the generic item vegetable oil" may be flagged as a staple item). In other embodiments, the product module 404 may determine staple products for the customer 104 based on the customer's order history. Determining staple items is described in co-pending U.S. application Ser. No. 16/450,935, filed on Jun. 24, 2019, which is incorporated by reference in its entirety. The product module 404 removes determined staple items from the generic items.

Further, in some embodiments, the product module 404 may access a record of the customer's historical orders from the customer database 214 and determine, for orders within a threshold amount of time from a current time, whether the customer ordered a product mapped to the generic item. If so, the product module 404 may remove the generic item from the generic items mapped for the recipe, such as with items of a large quantity or that have long storage times (e.g., a gallon of "Ollie's Olive Oil"). Alternatively, the product module 404 may send an indication to the CMA 106 to ask the customer 104 (via a notification with interactive elements) if he/she is out of the generic item. The product module 404 may remove the generic item from the mapped generic items upon receiving an indication from the CMA 106 that the customer 104 still has a product associated with the generic item.

The product module 404 queries the product database 408 with each mapped generic item to obtain one or more products for the mapped generic item. Alternatively, in some embodiments, the product module 404 may use a search ranking model to determine one or more products for the generic item. For example, the search query model may be a machine-learned model configured to match generic items to products. The search query model may be trained based on generic items labeled with products that have similar attributes or names to the generic item (e.g., the generic item "milk" has the attribute "dairy product," as does the product "Moo Moo Milk, which also includes the term "milk" in its name).

For each mapped generic item, the product module 404 applies a conversion model 406 to each of the one or more products for the mapped generic item to determine a conversion likelihood for each product. The conversion model 406 is a machine-learned model trained based on historical data describing previous conversions by customers 104 presented with an opportunity to add products to an order. A conversion may be an instance when a customer 104 purchased a product added to an order on the online concierge system 102 in an order and/or may be an instance when a customer 104 was presented with a product via the customer ordering interface and added the product to an order. The conversion model 406 may be trained on products available at one or more retailers 110 each labeled with a historical conversion rate (e.g., how often the product was viewed and subsequently ordered or added to an order by a customer 104). In some embodiments, the conversion model may be trained on historical conversions at the retailer 110 of the request. In other embodiments, the conversion model may be trained on historical conversions by the customer 104 of the request. The conversion model 406 outputs, for each input product, a conversion likelihood representing how likely the customer 104 is to order the product given historical conversion rates.

In some embodiments, the product module 404 may communicate with the retailer 110 of the request to determine whether each of the one or more products is available for purchase. If a product is not available, the product module 404 may remove the product from the one or more products. In further embodiments, the product module 404 may only communicate with the retailer about availability of products with a conversion likelihood below a threshold and remove products that are unavailable upon receiving an indication from the retailer 110.

For the one or more products determined for each mapped generic item, the product module 404 ranks the one or more products using the conversion likelihoods. For instance, the product module 404 may rank the one or more products from highest conversion likelihood to lowest conversion likelihood. The product module 404 selects the product ranked the highest (e.g., with the highest conversion likelihood) to add an order for the customer 104. In some embodiments, the product module 404 may send the selected product to the CMA 106 for presentation to the customer 104, who may approve or reject the product for addition to the order via the customer ordering interface. The product module 404 may additionally send the products ranked below the selected product as substitute products to the CMA 106 for instances when the customer 104 requests a substitute product for the selected product via the customer ordering interface or when the selected product is unavailable at the retailer 110.

In other embodiments, the product module 404 selects a subset of the ranked products to send to the CMA 106 for the customer 104 to select from. For instance, the product module 404 may remove products with a conversion likelihood below a threshold from the ranked products or may remove products not within a top portion of the ranking (e.g. the products ranked in the top 10). The product module 404 sends the subset to the CMA 106 for presentation to the customer 104 and may receive an indication of one or more products to add to the order. The product module 404 may add the one or more products to the order.

Figure 5A:
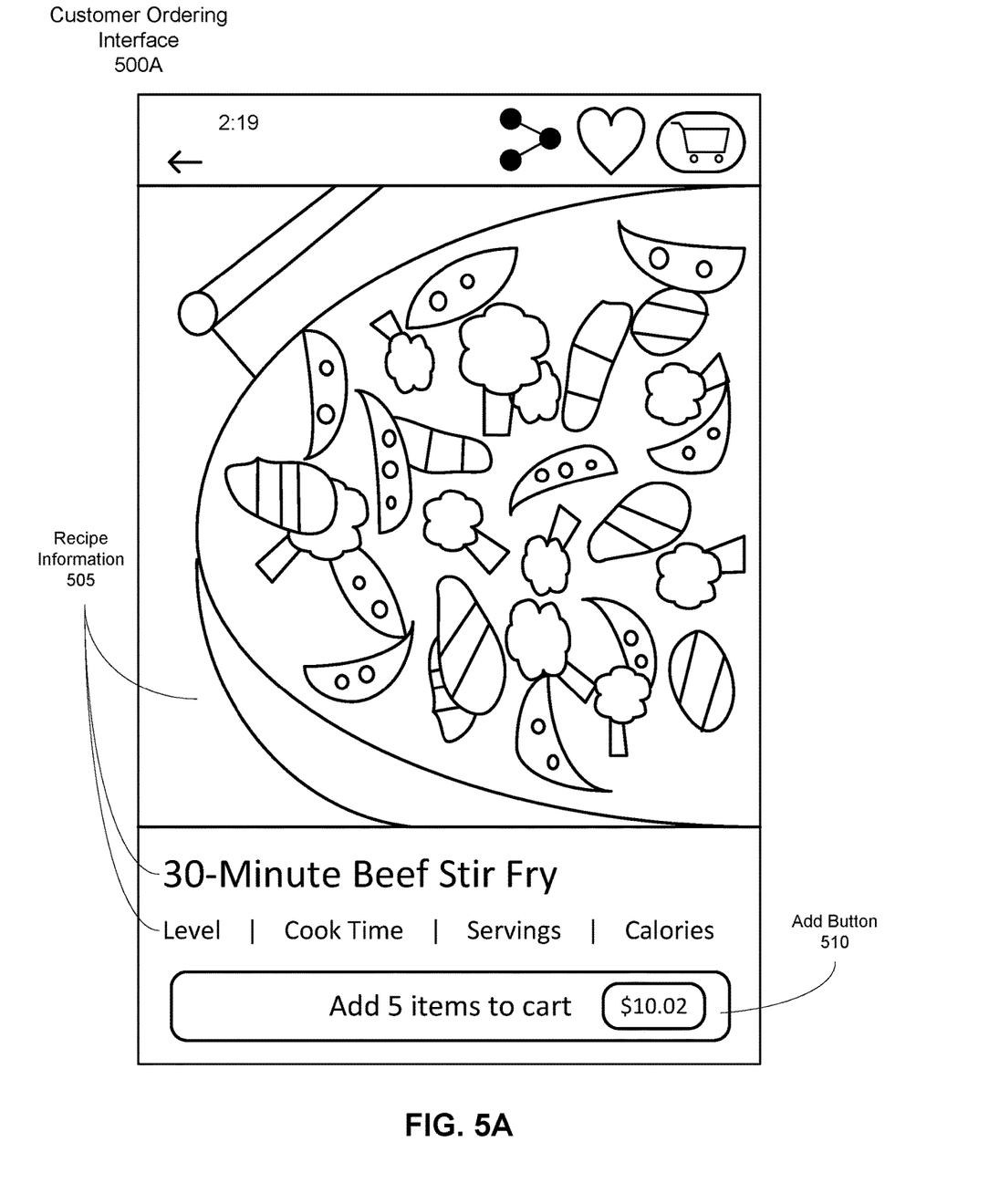
FIG. 5A is a customer ordering interface showing recipe information, according to one embodiment.

FIG. 5A is a customer ordering interface 500A showing recipe information 505, according to one embodiment. The customer ordering interface 500A displays recipe information for a recipe, such as a title, image, skill level, cook time, number of servings, description, and nutrition information. In some embodiments, a customer 104 may scroll via the customer ordering interface 500A to see more recipe information. The customer ordering interface 500A may also include a plurality of interactive elements, such as the add button 510. A customer 104 may interact with the add button 510 to add products for the recipe to an order, and the add button 510 may be displayed with a price of the products for the recipe. The products may be determined by the order interface engine 216 for the recipe.

In some embodiments, a similar customer ordering interface to the customer ordering interface 500A of FIG. 5A may be shown by a third party system. In these embodiments, the add button 510 may integrate with the online concierge system via an API such that when a customer 104 interacts with the add button 510, the customer ordering interface 500 may display information from the online concierge system 102 for facilitating an order with the products for the recipe.

Figure 5B:
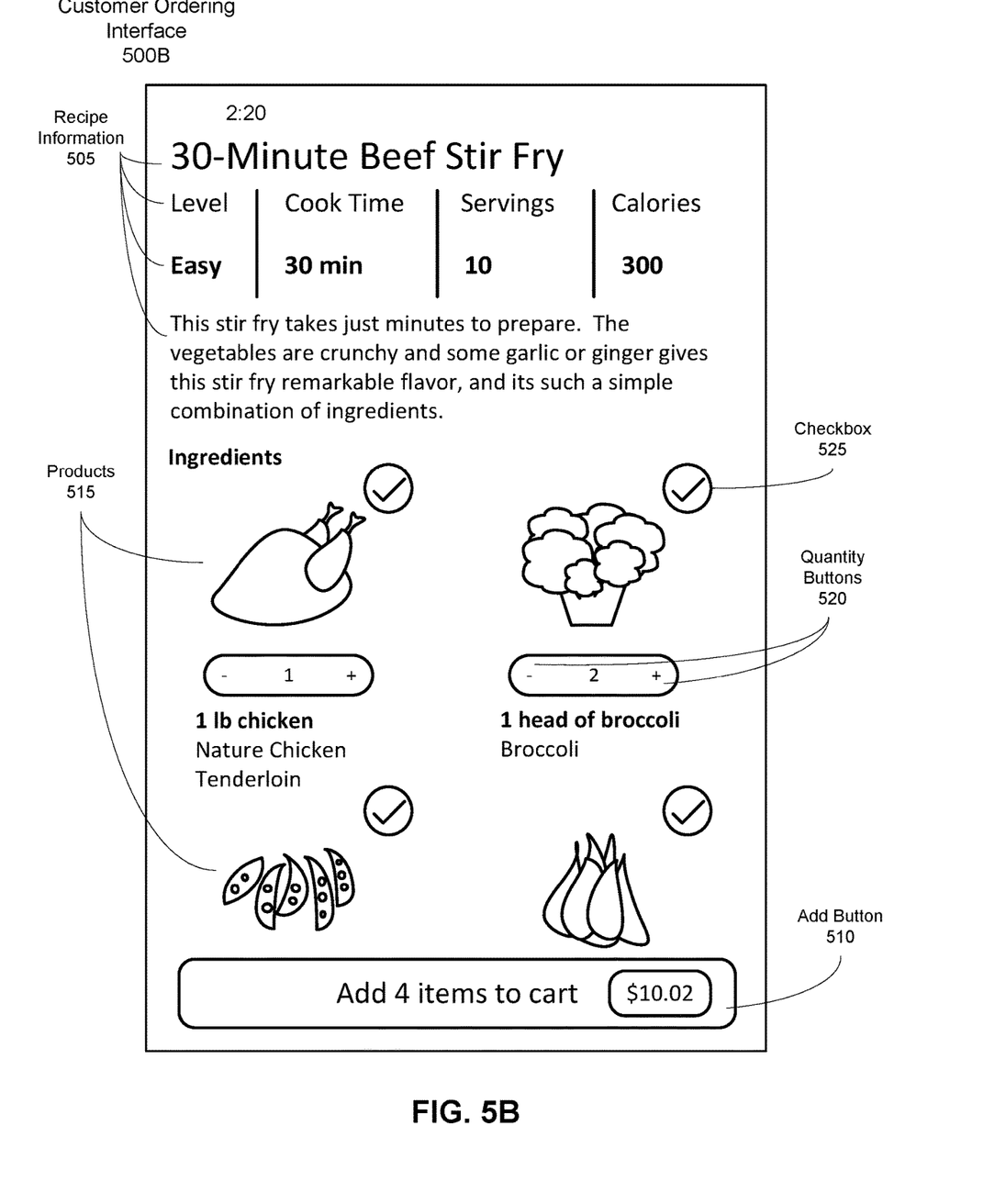
FIG. 5B is a customer ordering interface showing products for a recipe, according to one embodiment.

FIG. 5B is a customer ordering interface 500B showing products for a recipe, according to one embodiment. The customer ordering interface 500B may include recipe information 505, as described in relation to FIG. 5A. The customer ordering interface 500B also includes one or more products 515 (indicated under "Ingredients" in FIG. 5B) determined for the recipe by the order interface engine 216. Each product 515 may be displayed with images, a title, a description, a quantity, price, and other product information about the product 515, which may be received from the inventory database 204. A customer 104 may interact with the quantity buttons 520 to alter the quantity of each product 515 to add to an order via the add button. Furthermore, the customer 104 may interact with a checkbox 525 associated with each product 515 to select (when the checkbox 525 is checked) or unselect (when the checkbox 525 is unchecked) the product 515 for addition to the order.

Figure 5C:
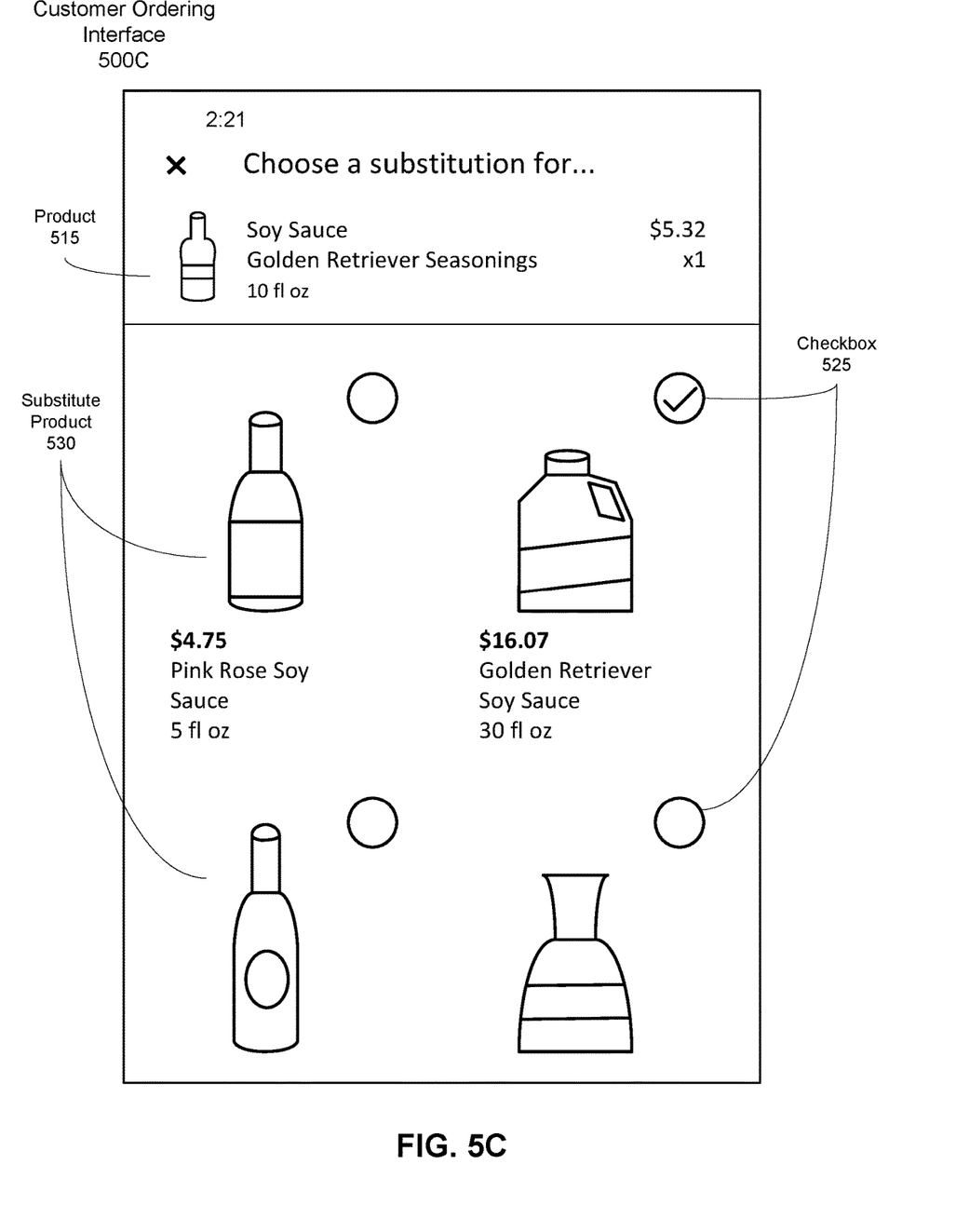
FIG. 5C is a customer ordering interface showing substitute products, according to one embodiment.

FIG. 5C is a customer ordering interface 500C showing substitute products, according to one embodiment. The customer ordering interface 500C displays a product that is an ingredient for the recipe but may be unavailable at the retailer 110. Alternatively, the customer 104 may indicate, reducing the quantity to "0" of a product 515 displayed via the customer ordering interface 500B, that he/she does not want the product 515 and would like a substitute product 530 instead. The customer ordering interface 500C displays substitute products 530 below the product 515, and the customer 104 may select one or more of the substitute products 530 using the checkboxes 525. The substitute products may be determined by the product module 404 for the same generic item as the product 515.

In some embodiments, the customer ordering interface 500C may additionally display widgets representing recipes previously used by the customer 104, which the customer 104 may save as "their" recipes. Furthermore, the customer ordering interface 500C may display products 515 to reorder, widgets representing suggested recipes from the recipe module 402, retailers 110 the customer 104 has previously ordered from (ranked by frequency or recency of order), categories of recipes (i.e., occasions, cuisines, meal of the day, etc.), and staple items or products 515 the customer 104 may already have. Upon receiving an interaction with a widget representing a recipe, the customer ordering interface 500C may display recipe information for the recipe, such as instructions for making the recipe (with images or video of the recipe being made), nutrition information, ratings, and reviews.

Figure 6:
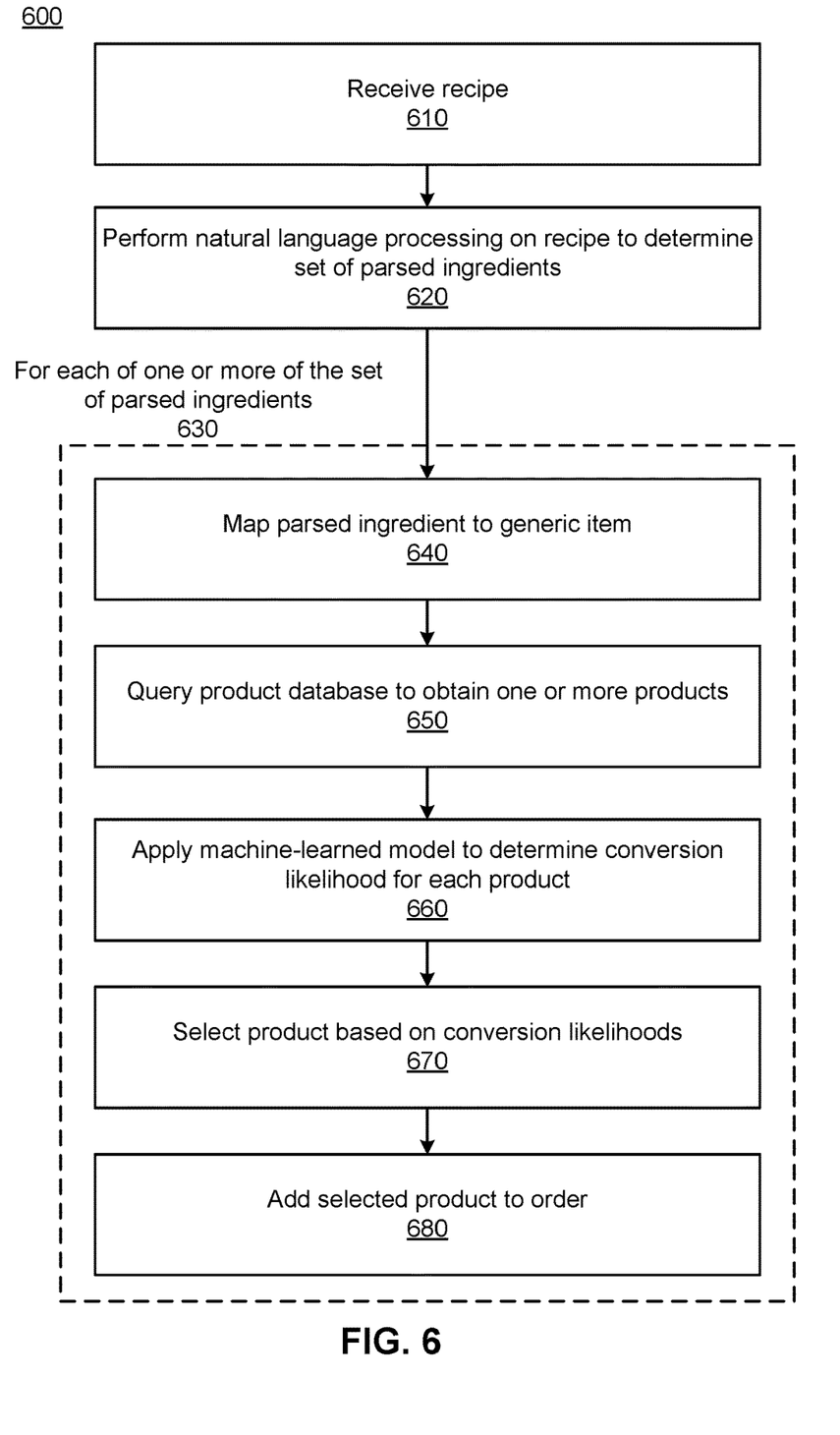
FIG. 6 is a flowchart illustrating a process for adding a product for a recipe to an order, according to one embodiment.

FIG. 6 is a flowchart illustrating a process 600 for adding a product for a recipe to an order, according to one embodiment. In particular, the order interface engine 216 receives 610 a recipe from the CMA 106. In some embodiments, the order interface engine 216 may receive the recipe from a third party system responsive to receiving information describing an interaction performed by a customer 104 with an interactive element via an API of a customer mobile device. In other embodiments, the order interface engine 2156 may retrieve the recipe from the recipe database 408 responsive to receiving an interaction with an interactive element presented via a user interface by the CMA 106.

The order interface engine 216 performs 620 natural language processing on the recipe to determine a set of parsed ingredients. The natural language processing may be a performed using a machine-learned model. For each of one or more of the set of parsed ingredients 630, the order interface engine 216 maps 640 the parsed ingredient to a generic item of a plurality of generic items in the product database 412 that associates generic items with a set of products that represent items for sale at a retailer. The order interface engine 216 queries 650 the product database 412 with the mapped generic item to obtain one or more products associated with the mapped generic item in the product database 412. The online concierge system applies 660 the conversion model 406 to each of the one or more products to determine a conversion likelihood for the product. The conversion model 406 may be trained based on historical data describing previous conversions made by customers presented with an opportunity to add products to an order. For example, the conversion model 406 may be trained on products historically ordered from a retailer 110 each labeled with a conversion rate indicting how often the product was added to an order fulfilled at the retailer 110. In another example, the conversion model 406 may be trained on products historically ordered by a customer 104 associated with the customer mobile device. The order interface engine 216 selects 670 a product from the one or more products based on the determined conversion likelihoods and adds 680 the selected product to an order associated with the customer mobile device.

It is appreciated that although FIG. 6 illustrates a number of interactions according to one embodiment, the precise interactions and/or order of interactions may vary in different embodiments. For example, in some embodiments, the order interface engine 216 may transmit the selected product to the CMA 106 for display via the customer ordering interface 500. Responsive to receiving an indication that a customer 104 approved the selected product via the customer ordering interface 500, the order interface engine 216 may add the selected product to the order. In another embodiment, the order interface engine 216 may add the selected product to the order responsive to receiving an indication via an interactive element of the user interface to add the selected product to the order. Alternatively, the order interface engine 216 may create a ranked list of the products based on the determined conversion likelihoods and remove products with a conversion likelihood below a threshold from the ranked list. The order interface engine 216 may send the ranked list (or a subset of the ranked list) for display via the customer ordering interface 500 and add a product selected by a customer 104 from the ranked list to the order.

OTHER CONSIDERATIONS

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method comprising:
receiving unstructured information comprising a recipe from a user via a first user interface;
generating a second user interface comprising one or more user interface elements associated with a list of products for the user to fulfill the recipe, wherein generating the second user interface comprises:
processing the unstructured information to extract a set of parsed ingredients in the recipe; and
for each of one or more of the set of parsed ingredients:
applying a search query model to the parsed ingredient, which outputs a score for one generic item of a plurality of generic items in a product database;
mapping the parsed ingredient to a generic item of the plurality of generic items in the product database using the search query model, wherein the product database associates each generic item with a set of products that represent items for sale at a retailer, wherein each generic item represents a generic version of an ingredient;
querying the product database with the mapped generic item to obtain one or more products associated with the mapped generic item in the product database, wherein a product is a branded version of the mapped generic item that is available at the retailer;
determining whether each of the one or more products is available for purchase;
selecting a product from the available products based on previous order history;
adding the selected product to a user interface element in the second user interface for display to the user;
receiving, from the user, an interaction with one of the one or more user interface elements indicating that the user deselects the respective product displayed in the one of the one or more user interface elements;
automatically transitioning the second user interface to a third user interface displaying a set of substitute products to the user, wherein the third user interface comprises a set of substitute interface elements, each displaying a substitute product for substituting the deselected product, and the deselected product and the set of substitute products are mapped to a same generic item.

2. The computer-implemented method of claim 1, wherein mapping the parsed ingredient to a generic item of the plurality of generic items in the product database using the search query model comprises:
ranking the score for each generic item of that plurality of generic items that is output from the search query model; and
selecting the mapped generic item based on the rank of the output scores.

3. The computer-implemented method of claim 1, wherein the search query model is trained on the generic items labeled with products that have similar attributes or names to the generic items.

4. The computer-implemented method of claim 1, wherein applying a search query model to the parsed ingredient comprises:
applying string matching to match the parsed ingredient to a generic item.

5. The computer-implemented method of claim 1, wherein processing the recipe to extract a set of parsed ingredients comprises:
performing named entity recognition on the recipe to extract the set of parsed ingredients.

6. The computer-implemented method of claim 1, wherein the recipe is stored at a third party system and receiving the recipe from the user comprises:
responsive to receiving, via an API of a mobile device, information describing an interaction performed by the user with an interactive element, receiving the recipe from the third party system.

7. The computer-implemented method of claim 1, wherein receiving the recipe from the user comprises:
responsive to receiving a user interaction with an interactive element presented at a mobile device, retrieving the recipe from the recipe database.

8. A non-transitory computer-readable medium comprising stored instructions that when executed by one or more processors of one or more computing devices, cause the one or more computing devices to:
receive unstructured information comprising a recipe from a user via first user interface;
generate a second user interface comprising one or more user interface elements associated with a list of products for the user to fulfill the recipe, wherein the instructions to generate the second user interface further cause the one or more computing devices to:
process the unstructured information to extract a set of parsed ingredients in the recipe; and
for each of one or more of the set of parsed ingredients:
apply a search query model to the parsed ingredient, which outputs a score for one generic item of a plurality of generic items in a product database;
map the parsed ingredient to a generic item of the plurality of generic items in the product database using the search query model, wherein the product database associates each generic item with a set of products that represent items for sale at a retailer, wherein each generic item represents a generic version of an ingredient;
query the product database with the mapped generic item to obtain one or more products associated with the mapped generic item in the product database, wherein a product is a branded version of the mapped generic item that is available at the retailer;
determine whether each of the one or more products is available for purchase;
select a product from the available products based on previous order history;
add the selected product to a user interface element in the second user interface for display to the user;
receive, from the user, an interaction with the one of the one or more user interface elements indicating that the user deselects the respective product displayed in the one of the one or more user interface elements;
automatically transition the second user interface to a third user interface displaying a set of substitute products to the user, wherein the third user interface comprises a set of substitute interface elements, each displaying a substitute product for substituting the deselected product, and the deselected product and the set of substitute products are mapped to a same generic item.

9. The non-transitory computer-readable medium of claim 8, wherein the instructions to map the parsed ingredient to a generic item of the plurality of generic items in the product database using the search query model comprise:
ranking the score for each generic item of that plurality of generic items that is output from the search query model; and
selecting the mapped generic item based on the rank of the output scores.

10. The non-transitory computer-readable medium of claim 8, wherein the search query model is trained on the generic items labeled with products that have similar attributes or names to the generic items.

11. The non-transitory computer-readable medium of claim 8, wherein the instructions to apply a search query model to the parsed ingredient comprise:
applying string matching to match the parsed ingredient to a generic item.

12. The non-transitory computer-readable medium of claim 8, wherein the instructions to process the recipe to extract a set of parsed ingredients comprise:
performing named entity recognition on the recipe to extract the set of parsed ingredients.

13. The non-transitory computer-readable medium of claim 8, wherein the recipe is stored at a third party system and the instructions to receive the recipe from the user comprise:
responsive to receiving, via an API of a mobile device, information describing an interaction performed by the user with an interactive element, receiving the recipe from the third party system.

14. The non-transitory computer-readable medium of claim 8, wherein the instructions to receive the recipe from the user comprise:
responsive to receiving a user interaction with an interactive element presented at a mobile device, retrieving the recipe from the recipe database.

15. A computer system comprising:
a computer processor; and a non-transitory computer-readable storage medium storage instructions that when executed by the computer processor perform actions comprising:
- receiving unstructured information comprising a recipe from a user via a first user interface;
- generating a second user interface comprising one or more user interface elements associated with a list of products for the user to fulfill the recipe, wherein generating the second user interface comprises:
  - processing the unstructured information to extract a set of parsed ingredients in the recipe; and
  - for each of one or more of the set of parsed ingredients:
    - applying a search query model to the parsed ingredient, which outputs a score for one generic item of a plurality of generic items in a product database;
    - mapping the parsed ingredient to a generic item of the plurality of generic items in the product database using the search query model, wherein the product database associates each generic item with a set of products that represent items for sale at a retailer, wherein each generic item represents a generic version of an ingredient;
    - querying the product database with the mapped generic item to obtain one or more products associated with the mapped generic item in the product database, wherein a product is a branded version of the mapped generic item that is available at the retailer;
    - determining whether each of the one or more products is available for purchase;
    - selecting a product from the available products based on previous order history;
    - adding the selected product to a user interface element in the second user interface for display to the user;
- receiving, from the user, an interaction with one of the one or more user interface elements indicating that the user deselects the respective product displayed in the one of the one or more user interface elements;
- automatically transitioning the second user interface to a third user interface displaying a set of substitute products to the user, wherein the third user interface comprises a set of substitute interface elements, each displaying a substitute product for substituting the deselected product, and the deselected product and the set of substitute products are mapped to a same generic item.

16. The computer system of claim 15, wherein mapping the parsed ingredient to a generic item of the plurality of generic items in the product database using the search query model comprises:
- ranking the score for each generic item of that plurality of generic items that is output from the search query model; and
- selecting the mapped generic item based on the rank of the output scores.

17. The computer system of claim 15, wherein the search query model is trained on the generic items labeled with products that have similar attributes or names to the generic items.

18. The computer system of claim 17, wherein applying a search query model to the parsed ingredient comprises:
- applying string matching to match the parsed ingredient to a generic item.

* * * * *